United States Patent
Ramakrishnan et al.

(10) Patent No.: US 7,607,303 B2
(45) Date of Patent: Oct. 27, 2009

(54) ZERO EMISSION NATURAL GAS POWER AND LIQUEFACTION PLANT

(75) Inventors: Terizhandur S. Ramakrishnan, Bethel, CT (US); Sandeep Verma, Village of Nagog Woods, MA (US); Wenlin Zhang, Gloucestershire (GB); Philippe Lacour-Gayet, New York, NY (US); Muthusamy Vembusubramanian, Acton, MA (US)

(73) Assignee: Schlumberger Technology Corporation, Cambridge, MA (US)

(*) Notice: Subject to any disclaimer, the term of this patent is extended or adjusted under 35 U.S.C. 154(b) by 360 days.

(21) Appl. No.: 11/616,591

(22) Filed: Dec. 27, 2006

(65) Prior Publication Data

US 2008/0155958 A1    Jul. 3, 2008

(51) Int. Cl.
*F03G 7/00* (2006.01)
(52) U.S. Cl. .................................... 60/641.2; 60/641.3
(58) Field of Classification Search ............... 60/641.2, 60/641.3, 641.4
See application file for complete search history.

(56) References Cited

U.S. PATENT DOCUMENTS

| | | | |
|---|---|---|---|
| 5,401,589 A * | 3/1995 | Palmer et al. | 429/13 |
| 7,041,272 B2 * | 5/2006 | Keefer et al. | 423/651 |
| 7,043,920 B2 | 5/2006 | Viteri et al. | |
| 7,178,337 B2 * | 2/2007 | Pflanz | 60/641.2 |
| 7,334,406 B2 * | 2/2008 | Licari et al. | 60/641.2 |

FOREIGN PATENT DOCUMENTS

WO    03/031047 A1    4/2003

OTHER PUBLICATIONS

EG&G Technical Services, Inc. "Fuel Cell Handbook", Chapter 7, "Solid Oxide Fuel Cells", pp. 7-1-7-49, U.S. Department of Energy, Nov. 2004.
Wagner et al., "Steam reforming analyzed", Hydrocarbon Processing, pp. 69-77, Jul. 1992.

* cited by examiner

*Primary Examiner*—Hoang M Nguyen
(74) *Attorney, Agent, or Firm*—Helene Raybaud; James McAleenan; Jody Lynn DeStefanis (57) ABSTRACT

A zero-emissions power plant receives natural gas from wells at elevated pressure and temperature. Gas is expanded through one or more turbo-expanders, preferably reformed, and sent to a fuel cell where electricity, heat, carbon-dioxide, and water are generated. The carbon-dioxide is compressed by at least one compressor and piped downhole for sequestration. The turbo-expanders have shafts which preferably share the shafts of the compressors. Thus, energy given up by the natural gas in the turbo-expanders is used to run compressors which compress carbon dioxide for downhole sequestration. In one embodiment, the natural gas is applied to heat exchangers in order to generate a stream of liquid natural gas. The remainder of the gas is expanded through the turbo-expanders and processed in the reformer prior to being sent to the fuel cell. A shifter may be used between the reformer and fuel cell. A solid oxide fuel cell is preferred.

17 Claims, 6 Drawing Sheets

ZERO EMISSION NATURAL GAS POWER AND LIQUEFACTION PLANT

BACKGROUND OF THE INVENTION

1. Field of the Invention

This invention relates broadly to natural gas power plants. More particularly, this invention relates to power plants which utilize natural gas recovered from gas fields and which generate power with no atmospheric emissions of greenhouse gases due to sequestration of carbon dioxide by-products. The power plants of the invention can provide pure liquid natural gas (LNG) and/or hydrogen gas as a desired output.

2. State of the Art

Global warming and its potential impact on earth's climate, ocean levels and human lifestyles are active areas of research and discussion. While there is some debate over the causes of global warming, there is unequivocal data that the atmospheric levels of greenhouse gases, which include carbon dioxide ($CO_2$) are rising rapidly. Carbon dioxide levels in the earth's atmosphere are at historic high levels. Although the greenhouse warming potential of carbon dioxide is small compared to some of the other greenhouse gases, due to the sheer mass of carbon dioxide emitted into the atmosphere, carbon dioxide presently has the highest impact of any greenhouse gas in the atmosphere.

It is estimated that globally, over 24 billion metric tons (tonnes) of carbon dioxide were emitted into the earth's atmosphere in 2001 as a result of burning fossil fuels. Some predict that by the year 2025, global emissions of carbon dioxide may reach 35 billion tonnes. It is clear that technological solutions to improved energy solutions that reduce greenhouse gas emissions need to be researched, engineered and implemented. It is also clear that no large-scale replacement or substitution for fossil fuels is likely to appear in the very short term. However, if it is possible to capture and store (or sequester) a significant amount of carbon dioxide released into the atmosphere, the potential impact of carbon dioxide on global warming may be limited. The sequestration process is also likely to provide additional time for society to research and engineer alternative energy solutions.

Geological formations such as saline aquifers, abandoned oil and gas fields, and coal bed methane reservoirs are the leading candidates for long term storage of carbon dioxide. Efforts are underway to identify suitable geological sites for carbon dioxide sequestration close to industrial areas that release a high amount of carbon dioxide into the atmosphere (e.g., the Mountaineer Plant in the Ohio river valley, West Virginia, the South Liberty Oil field near Houston, Tex., etc.). Proximity of a sequestration site to a large source of carbon dioxide is desirable to avoid the high transport costs of pumping carbon dioxide over large distances. This invention considers sequestration of carbon dioxide close to the power plant to minimize transportation costs.

SUMMARY OF THE INVENTION

It is therefore an object of the invention to provide natural gas power plants at or close to gas fields which generate power with no atmospheric emissions of greenhouse gases.

It is another object of the invention to provide natural gas power plants at or close to gas fields which generate power and which sequester carbon dioxide by-products in the gas fields.

It is a further object of the invention to provide natural gas power plants at or close to gas fields that generate substantially pure LNG as a product.

It is also an object of the invention to provide natural gas power plants at or close to gas fields that generate potable water as a by-product.

Another object of the invention is to provide natural gas power plants that can process natural gas having low to high carbon dioxide content without emitting greenhouse gases.

A further object of the invention is to provide natural gas power plants which can generate hydrogen gas as a by-product.

In accord with these objects, which will be discussed in detail below, according to one embodiment, a natural gas power plant is located at or close to a gas field. The natural gas power plant takes natural gas from wells in the gas field and utilizes the natural gas, a solid oxide fuel cell (SOFC), and air to generate electricity, heat, and by-products such as water and carbon dioxide. The carbon dioxide by-product of the SOFC is compressed and directed downhole and into the formation for sequestration.

According to another embodiment, the natural gas received from the wells in the gas field is at an elevated pressure and temperature and is expanded through one or more turbo-expanders. The turbo-expanders have shafts that are mechanically coupled to the shafts of one or more compressors, or which, more preferably share the shafts. Thus, the energy given up by the natural gas in the turbo-expanders is used to run compressors which compress carbon dioxide for downhole sequestration.

According to another embodiment, the natural gas received from the wells in the gas field is at an elevated pressure and temperature and is subjected to one or more heat exchangers in order to reduce the temperature sufficiently so that a stream of liquid natural gas (LNG) may be obtained from a portion of the natural gas. In addition to the LNG stream, some of the natural gas is reheated in the heat exchangers and then utilized in conjunction with one or both of the other embodiments. Thus, the non-LNG stream of natural gas may be eventually forwarded to a solid oxide fuel cell (SOFC) and used to generate electricity, heat, and by-products such as water and carbon dioxide. The carbon dioxide by-product of the SOFC is compressed and directed downhole and into the formation for sequestration. Alternatively, or in conjunction with the use of the SOFC, the non-LNG stream may be expanded through one or more turbo-expanders as described above which have shafts which share or are mechanically coupled to the shafts or one or more compressors. Thus, the energy given up by the natural gas in the turbo-expanders is used to run compressors which compress carbon dioxide of the power generation unit for downhole sequestration.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
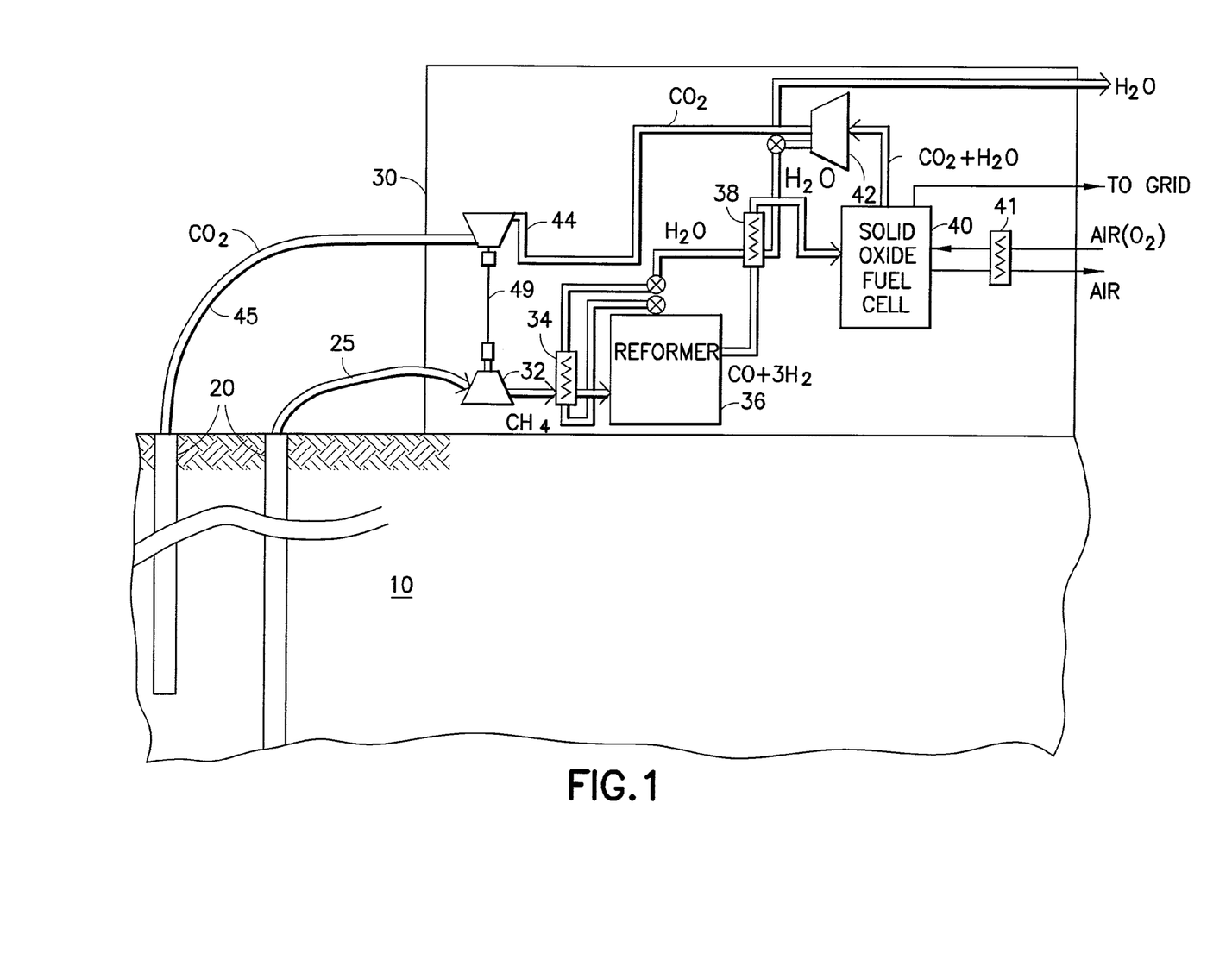
FIG. 1 is a schematic diagram of a first embodiment of the invention.

Turning to FIG. 1, a first embodiment of the invention is seen. A formation 10 having natural gas (or methane—the words being used interchangeably herein) is shown with one or more boreholes or wells 20 which are used for producing the natural gas. The natural gas is generally produced according to well-known techniques at a pressure range of between a few hundred psig (pounds per square inch gauge) to over ten thousand psig primarily depending upon the depth in the formation from which the gas is produced. The temperature of the gas is also typically elevated relative to the ambient formation surface temperature. According to the first embodiment, the natural gas produced at the wells 20 is piped via piping 25 to a power plant 30 which is located at or nearby the formation 10. The power plant 30 includes the following elements: one or more turbo-expanders 32, an optional heat exchanger 34, a reformer 36, a second optional heat exchanger 38, a solid oxide fuel cell (SOFC) 40, a separator 42, and a compressor 44.

As seen in FIG. 1, the power plant 30 receives the natural gas and runs it through one or more turbo-expanders 32 (one shown) where the expansion of the natural gas reduces its temperature and pressure, and where work is recovered as useful power (as described hereinafter). The outlet of the turbo-expander is provided to an optional heat exchanger 34 which (after start-up) preheats the natural gas prior to reaction in a reformer 36. The pre-heated natural gas is reacted in the reformer 36 with water which is generated at another portion of the cycle as hereinafter described and which is optionally preheated (after start-up) by the second heat exchanger 38 at a temperature of between 700° C. and 1100° C. (typically 900° C. at 20 psia—pounds per square inch absolute) in order to generate hydrogen gas ($H_2$) and carbon monoxide (CO) according to the reaction $CH_4 + H_2O \leftrightarrow CO + 3H_2$. The reaction is endothermic; i.e., it requires heat, which as discussed hereinafter is provided by the SOFC 40. The CO and $H_2$ mixture (along with any remaining methane and water) is cooled at the second heat exchanger 38 before being supplied to the SOFC 40.

The SOFC 40 is a solid oxide fuel cell which functions substantially as SOFCs sold by Siemens, AG of Germany or Acumentrics of Westwood, Mass. In particular, the gas stream (primarily CO and $H_2$ mixture with residual methane and water) is provided to the SOFC with an air stream containing oxygen. The reactions that take place in the SOFC include: (1) $CH_4 + H_2O \leftrightarrow CO + 3H_2$; (2) $CO + H_2O \leftrightarrow CO_2 + H_2$; and (3) $H_2 + 0.5\ O_2 \leftrightarrow H_2O$. The third reaction is exothermic and the free energy change for the reaction is highly negative such that the reaction will proceed to completion under suitable conditions. SOFCs operate at a high temperature. This permits for a highly efficient conversion to power, internal reforming and a high quality by-product heat which can be used to supply the post-start-up heat needed by the reformer 36 via heat exchangers 34 and 38.

The output of the SOFC is not only electric power and heat, but water (steam), carbon dioxide, and air with less oxygen. The air is released to the ambient atmosphere, and may be run through an optional heat exchanger 41 to warm incoming air. The water and carbon dioxide are separated by separator 42 which may be implemented as a cyclone separator or a membrane. Some of the water (steam) is piped back to the reformer 36 for use therein. The remainder is high purity water which may be bottled, stored or otherwise used (e.g., for agriculture). The carbon dioxide separated by the separator 42 is sent to one or more compressors 44 (one shown) which increases the pressure of the $CO_2$ to a level that permits pumping of the carbon dioxide via pipes or tubing 45 down into a well 20 and into the formation 10 for sequestration therein. As will be appreciated by those skilled in the art, the well into which the carbon dioxide is pumped for sequestration may or may not be the same well from which the methane is produced. Where the same well is utilized, the well will typically be a dual completion well.

Figure 1A:
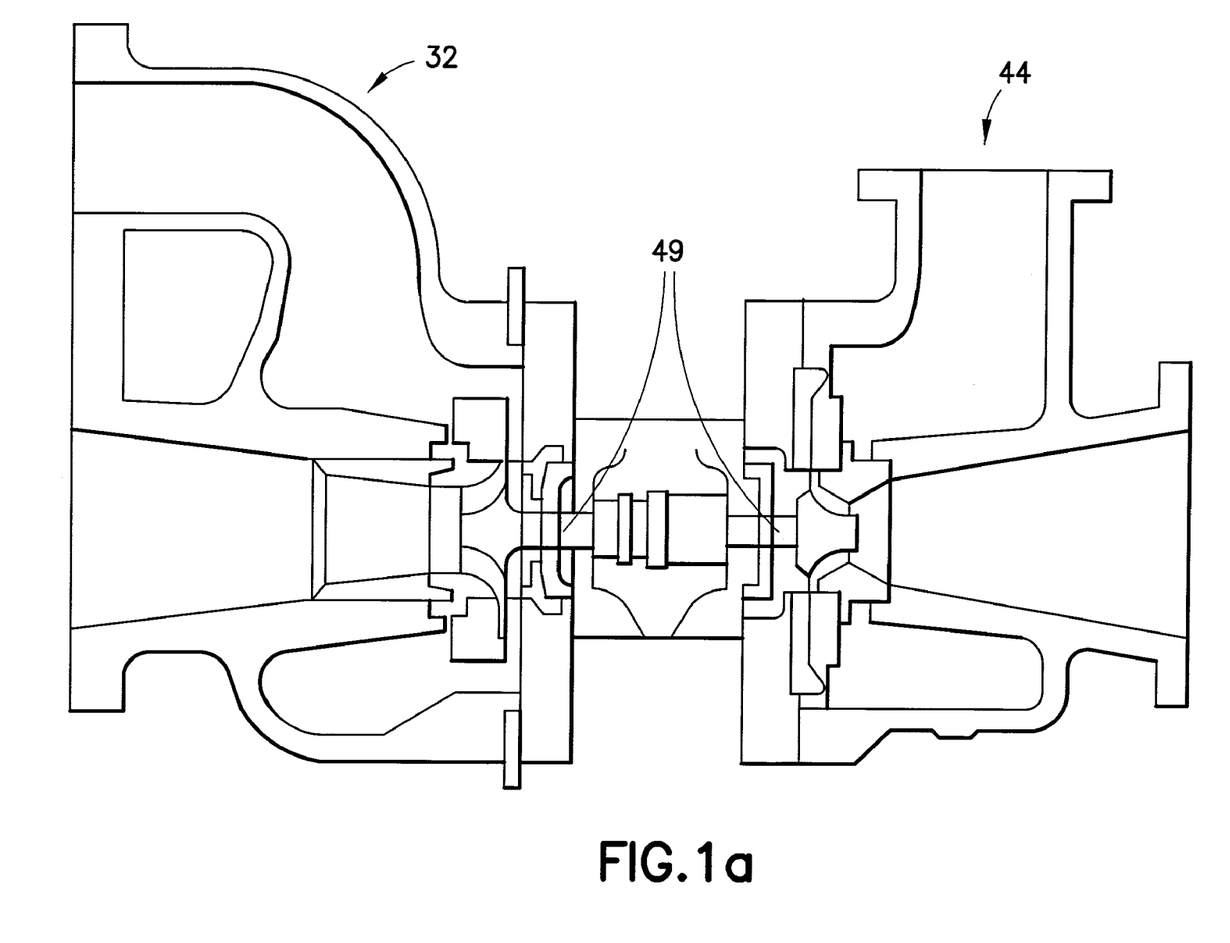
FIG. 1a is a cross section of a prior art expander/compressor turbine which utilizes a single shaft.

According to one aspect of the invention, the compressor (s) 44 of the system are powered by the turbo-expanders 32 of the system. More particularly, and as seen in FIG. 1a, a turbo-expander/compressor 48 which functions substantially as turbines manufactured by Cryostar (California) includes a compressor 44 and an expander 32 with a common shaft 49. Thus, all of the work recovered by the turbo-expander 32 is used on the compression side to drive the compressor 44. The direct transfer of work by the turbo-expander due to the expansion of the high pressure methane coming from the formation to the compressor for the purpose of compressing the carbon dioxide for sequestration, adds significantly to the efficiency of the system. If additional compression of the carbon dioxide is required, some of the electricity generated by the SOFC can be used to run an additional compressor.

According to another aspect of the invention, instead of feeding the entire output of the reformer 36 to the SOFC 40, some of the hydrogen gas generated at the reformer can be divided out from the stream and stored in appropriate storage facilities for use or shipment as desired.

It should be appreciated by those skilled in the art that the power plant 30 of FIG. 1 is capable of processing a natural gas stream having no, low or high carbon dioxide content. In particular, the carbon dioxide will move with the methane stream through any expanders, heat exchangers and the reformer, will be provided to the SOFC with the gas stream provided by the reformer, and will be separated by the separator along with the carbon dioxide that gets generated by the SOFC.

Figure 2:
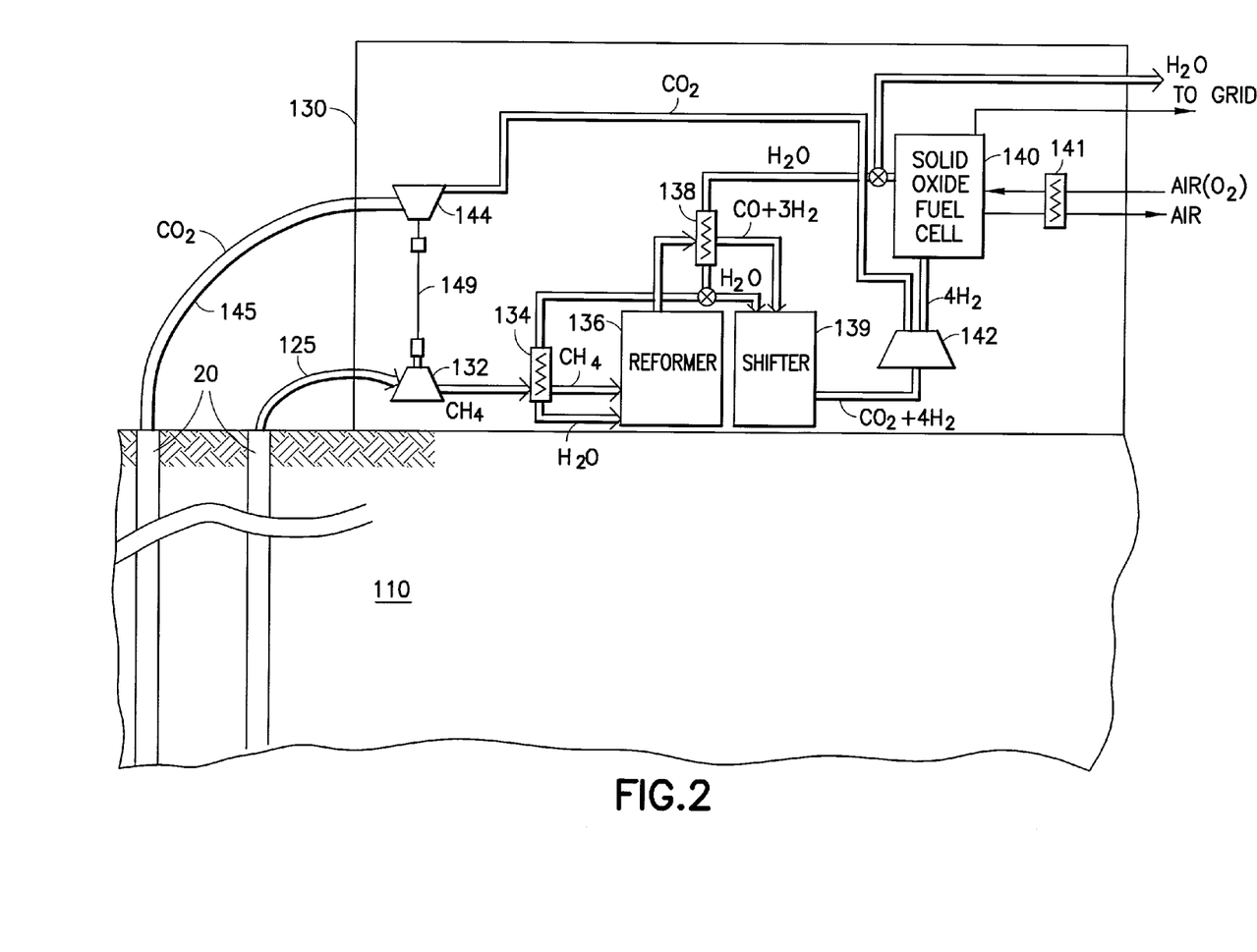
FIG. 2 is a schematic diagram of a second embodiment of the invention.

Turning now to FIG. 2, a second embodiment of the invention is seen. The second embodiment is similar to the first embodiment and like parts are shown with like numbers increased by "100". Thus, a formation 110 having natural gas (methane) is shown with one or more boreholes or wells 120 which are used for producing the natural gas. The natural gas is generally produced according to well-known techniques at a pressure range of between a few hundred psig to over ten thousand psig primarily depending upon the depth in the formation from which the gas is produced. The temperature of the gas is also typically elevated relative to the ambient formation surface temperature. According to the second embodiment, the natural gas produced at the wells 120 is piped via piping 125 to a power plant 130 which is located at or nearby the formation 110. The power plant 130 includes the following elements: one or more turbo-expanders 132, an optional heat exchanger 134, a reformer 136, a second optional heat exchanger 138, a shifter 139, a solid oxide fuel cell (SOFC) 140, a separator 142, and a compressor 144.

As seen in FIG. 2, the power plant 130 receives the natural gas and runs it through one or more turbo-expanders 132 (one shown) where the expansion of the natural gas reduces its temperature and pressure, and where work is recovered as useful power (as described hereinafter). The outlet of the turbo-expander is provided to an optional heat exchanger 134 which (after start-up) preheats the natural gas prior to reaction in a reformer 136. The pre-warmed natural gas is reacted in the reformer 136 with water which is generated at another portion of the cycle as hereinafter described and which is optionally preheated by the second heat exchanger 138 at a temperature of between 700° C. and 1100° C. in order to generate hydrogen gas ($H_2$) and carbon monoxide (CO) according to the reaction $CH_4+H_2O \leftrightarrow CO+3H_2$. The reaction is endothermic; i.e., it requires heat, which as discussed hereinafter is provided by the SOFC 140. The CO and $H_2$ mixture (along with any remaining methane and water) is cooled at the second heat exchanger 138 before being supplied to the shifter 139 such as a shifter similar to an Osaka Gas Model FPS 1000. In the shifter, the output from the reformer is reacted with water (also obtained from the output of the SFC 140 as described hereinafter) to generate carbon dioxide and hydrogen according to the reaction $CO+3H_2 \leftrightarrow CO_2+4H_2$. The carbon dioxide and hydrogen (along with any remaining methane, water and carbon monoxide) are then provided to the separator 142.

The separator 142 of the embodiment of FIG. 2 may be a membrane which functions to separate the larger carbon dioxide molecules from the smaller hydrogen molecules. Alternatively, other types of separators, e.g., separators based on pressure swing adsorption could be utilized. The carbon dioxide is provided to one or more compressors 144 (one shown) which increases the pressure of the $CO_2$ to a level that permits pumping of the carbon dioxide via pipes or tubing 145 down into a well 120 (which may or may not be the same well from which the methane is produced) and into the formation 110 for sequestration therein. The hydrogen is provided to the SOFC.

The SOFC 140 is a solid oxide fuel cell which functions substantially as SOFCs sold by Siemens AG of Germany or Acumentrics of Westwood Massachusetts. In particular, the $H_2$ gas stream from the separator 142 is provided to the SOFC with an air stream containing oxygen. The primary reaction that takes place in the SOFC is the exothermic reaction $H_2+0.5 O_2 \leftrightarrow H_2O$. The free energy change for the reaction is highly negative such that the reaction will proceed to the right under suitable conditions and will liberate a significant amount of energy. SOFCs operate at a high temperature. This permits for a highly efficient conversion to power, internal reforming and a high quality by-product heat which can be used to supply the post-start-up heat needed by the reformer 136 via heat exchangers 134 and 138.

The output of the SOFC is not only electric power and heat, but water (steam), and air with less oxygen. The air is released to the ambient atmosphere before which it may be run through an optional heat exchanger 141 to heat incoming air. Some of the water (steam) is piped back to the reformer 136 and to the shifter 139 (via heat exchanger 138) for use therein. The remainder is high purity water which may be bottled, stored or otherwise used (e.g., for agriculture).

According to one aspect of the invention, the compressor (s) 144 of the system are powered by the turbo-expanders 132 of the system as discussed above with reference to FIG. 1, and in a preferred embodiment are arranged to include a common shaft. Thus, all of the work recovered by the turbo-expander 132 is used on the compression side to drive the compressor 144. The direct transfer of work by the turbo-expander due to the expansion of the high pressure methane coming from the formation to the compressor for the purpose of compressing the carbon dioxide for sequestration, adds significantly to the efficiency of the system. If additional compression of the carbon dioxide is required, some of the electricity generated by the SOFC can be used to run an additional compressor.

According to another aspect of the invention, instead of feeding the entire output of the reformer 136 to the shifter 139, and/or instead of feeding the entire output of the shifter 139 to the SOFC 140, some of the hydrogen gas generated at the reformer and/or at the shifter 139 can be divided out from the stream and stored in appropriate storage facilities for use or shipment as desired.

It should be appreciated by those skilled in the art that the power plant 130 of FIG. 2 is capable of processing a natural gas stream having no, low or high carbon dioxide content. In particular, the carbon dioxide will move with the methane stream through any expanders, heat exchangers and the reformer, will be provided to the shifter with the gas stream provided by the reformer, and will be separated by separated by the separator 142 along with the carbon dioxide that gets generated by the shifter.

Figures 3, 3B:
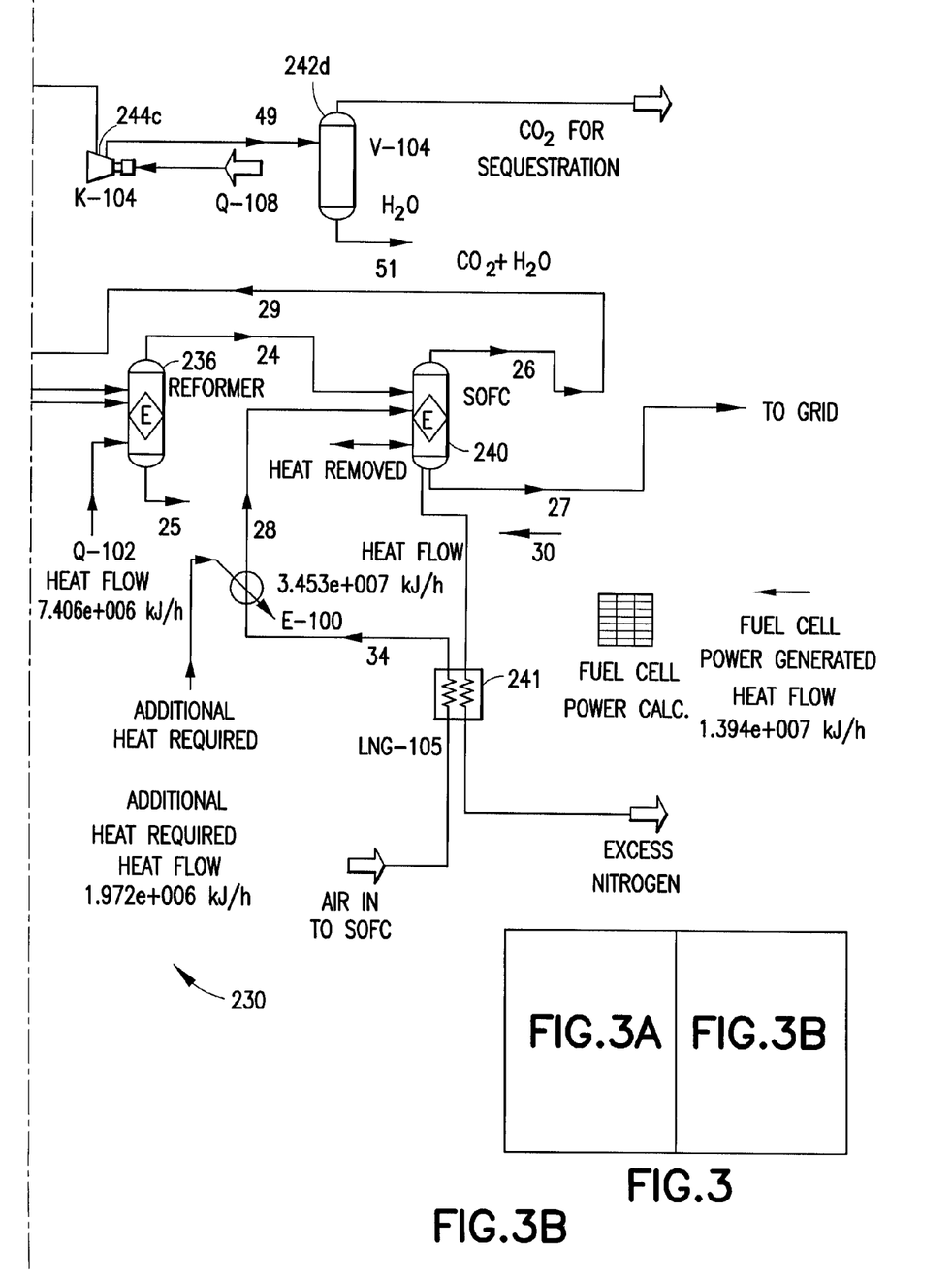
FIG. 3 is a schematic diagram of a third embodiment of the invention.
Figure 3A:
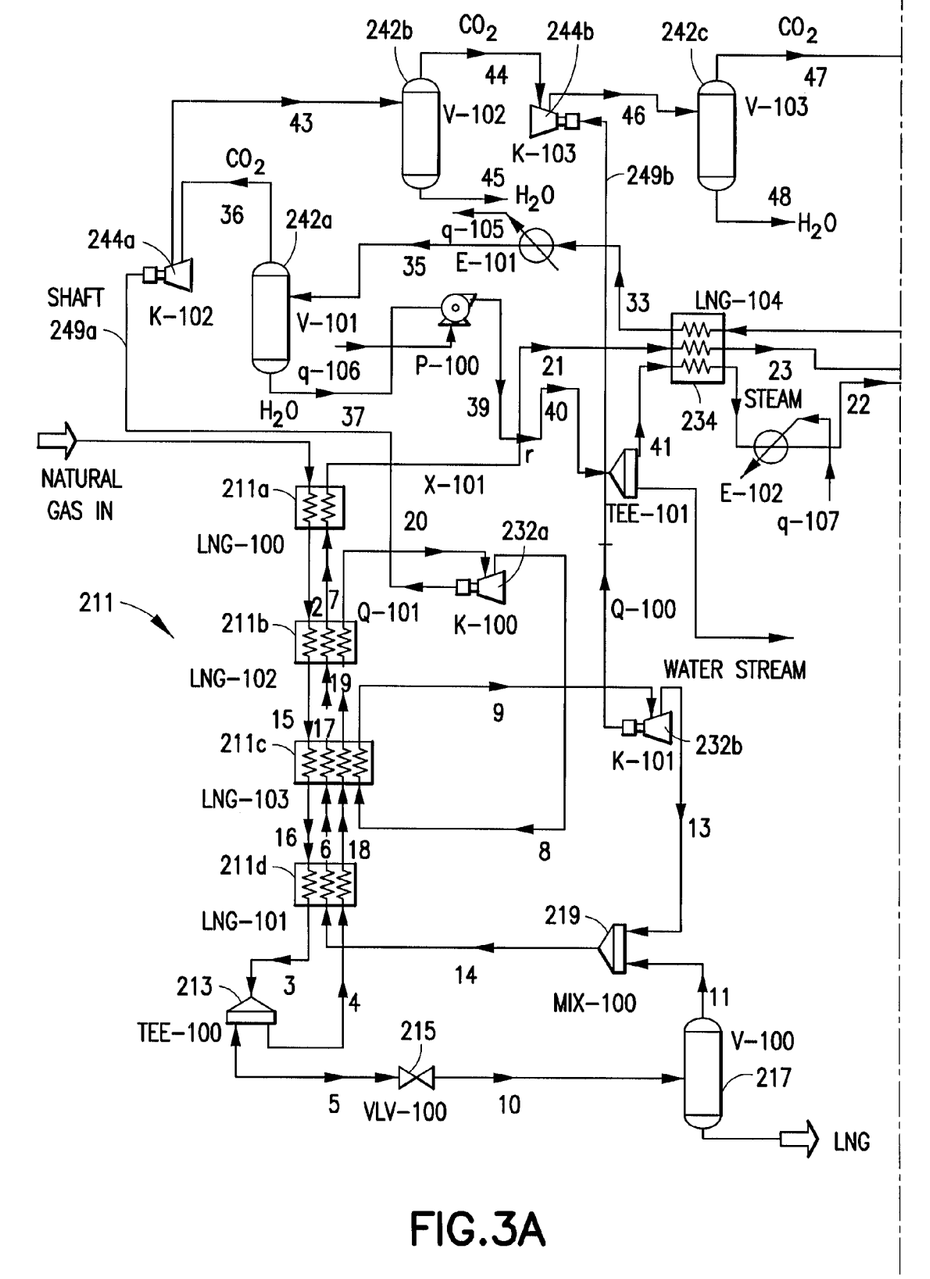

Turning now to FIG. 3, a third embodiment is seen. The third embodiment has certain common elements to the first embodiment (and second embodiment) and like elements are shown with like numbers increased by "200" relative to the first embodiment. Thus, a formation (not shown) having natural gas (methane) is traversed by one or more boreholes or wells (not shown) which are used for producing the natural gas. The natural gas is generally produced according to well-known techniques at a pressure range of between a few hundred psig to over ten thousand psig primarily depending upon the depth in the formation from which the gas is produced. The temperature of the gas is also typically elevated relative to the ambient formation surface temperature. According to the third embodiment, methane from the wells is piped via first pipes or tubes (not shown) to a power plant 230 which is located at or nearby the formation. The power plant 230 includes the following elements: a four stage heat exchanger 211 (with elements 211a, 211b, 211c, 211d), a stream divider 213, a valve expander 215, a vapor/liquid separator 217, a combiner 219, one or more turbo-expanders 232a, 232b, a heat exchanger 234, a reformer 236, a solid oxide fuel cell (SOFC) 240, an air/air heat exchanger 241, one or more moisture separators 242a, 242b, 242c, and one or more compressors 244a, 244b, 244c.

More particularly, natural gas provided from well(s) to the power plant 230 are sent to the four stage heat exchanger 211, where the temperature of the natural gas is reduced to a point where later expansion will result in liquefaction. The cooled natural gas is divided by stream divider 213 so that approximately 10% to 40% of the gas is sent to valve expander 215 and the remainder of the gas is sent back to the fourth stage 211d of the heat exchanger 211. The gas sent to the valve expander 215 is reduced in pressure by the valve expander, thereby causing much of the gas to liquefy. The stream is then provided to separator 217 which separates the liquid LNG from the natural gas vapor. The liquid LNG typically represents about 20-30% of the total methane provided by the wells 220, and is stored in appropriate storage facilities for shipment to desired locations as known in the art.

The methane gas which was sent back to the fourth stage 211d of the heat exchanger is warmed in three stages 211d, 211c, and 211b of the heat exchanger and is provided to turbo-expander 232a with a pressure ratio of 1.1 to 10.0 with a preferred range of 3.0 to 8.0. As a result of this expansion, useful work is recovered from the turbine as described hereinafter. The outlet temperature from the turbo-expander 232a is a function of the incoming temperature, the pressure ratio and the turbine efficiency. The outlet from the turbo-expander is then fed to the third stage 211c of the four stage heat exchanger where the stream is reheated, preferably to within a few degrees of ambient, and then provided to a second turbo-expander 232b which is substantially identical to turbo-expander 232a in its pressure ratio. The second turbo-expander likewise preferably provides useful work which is used as hereinafter described. The outlet from turbo-expander 232b is provided to combiner 219, where natural gas from the vapor separator 217 is combined with the natural gas from the turbo-expander 232b. The combined stream is then sent through all four stages of the heat exchanger 211 and then to another heat exchanger 234 for preheating before it is provided to the reformer 236.

The pre-warmed natural gas is reacted in the reformer 236 with water (which is generated at another portion of the cycle as hereinafter described) and which is preheated by heat heat exchanger 234 (or a separate heat exchanger—not shown) to a temperature of between 700° C. and 1100° C. in order to generate hydrogen gas ($H_2$) and carbon monoxide (CO) according to the reaction $CH_4+H_2O \leftrightarrow CO+3H_2$.

After reacting in the reformer 236, the carbon monoxide and hydrogen may be provided to the fuel cell 240 in the same manner as shown in FIG. 1, or may be sent to a shifter (not shown) in the same manner as shown in FIG. 2. For purposes of simplicity, the arrangement of FIG. 3 is shown similar to FIG. 1, with no shifter shown, and with carbon dioxide separation occurring after reactions in the fuel cell, and the embodiment of FIG. 3 is hereinafter described with reference to that type of arrangement. However, it should be appreciated that the invention includes an embodiment where the system of FIG. 3 utilizes the arrangement shown in FIG. 2, where the output of the reformer is provided to a shifter, and carbon dioxide separation is conducted prior to the stream reaching the SOFC 240.

The SOFC 240 is a solid oxide fuel cell which functions substantially as SOFCs sold by Siemens AG of Germany or Acumentrics of Westwood, Mass. In particular, the gas stream is provided to the SOFC with an air stream containing oxygen. The reactions that take place in the SOFC include: (1) $CH_4+H_2O \leftrightarrow CO+3H_2$; (2) $CO+H_2O \leftrightarrow CO_2+H_2$; and (3) $H_2+0.5\ O_2 \leftrightarrow H_2O$. The third reaction is exothermic and the free energy change for the reaction is highly negative such that the reaction will proceed to completion under suitable conditions. The overall free energy of the reactions is converted to electrical work in the SOFC dictated by the efficiency of the cell. SOFCs operate at a high temperature. This permits for a highly efficient conversion to power, internal reforming and a high quality by-product heat which can be used to supply the heat needed by the reformer 236; e.g., by heating up the methane stream and by providing a high-temperature water (steam) stream.

The output of the SOFC is not only electric power and heat, but water (steam), carbon dioxide, and air with less oxygen. The air is released to the ambient atmosphere, and may be run through an optional heat exchanger 241 to warm incoming air. The water (steam) and carbon dioxide are then sent to a series of moisture separators and compressors. As shown in FIG. 3, the water and $CO_2$ stream are first separated by a first moisture separator 242a which may be implemented as desired. Some of the water is piped back to the reformer 236 (via heat exchanger 234) for use therein. The remainder is high purity water which may be bottled, stored or otherwise used (e.g., for agriculture). The carbon dioxide separated by the separator 242a is sent to a first compressor 244a. The output of the first compressor 244a is then sent to a second moisture separator 242b which generates a water output stream and a more purified carbon dioxide stream. The carbon dioxide stream is compressed by the second compressor 244b, and is then sent to a third moisture separator 242c which generates a water output stream and an even more purified carbon dioxide stream. That stream is sent to a third compressor 244c which increases the pressure of the $CO_2$ to a level which permits pumping of the carbon dioxide down into a well and into the formation for sequestration therein.

The compressed stream may then be sent to a final moisture separator 242d before being sent downhole either to a different stratum of the well from which the methane was obtained (i.e., a dual completion well), or to a different well.

According to one aspect of the invention, the compressor (s) 244a and 244b of the system are powered by the turbo-expanders 232a and 232b of the system. More particularly, turbo-expander 232a and compressor 244a share a common shaft, and turbo-expander 232b and compressor 244b share a common shaft. Thus, all of the work recovered by the turbo-expanders 232a, 232b is used on the compression side to drive the compressors 244a, 244b. The direct transfer of work by the turbo-expanders due to the expansion of the high pressure natural gas coming from the formation to the compressor for the purpose of compressing the carbon dioxide for sequestration, adds significantly to the efficiency of the system. Third stage compressor 244c may be electrically driven by the electricity generated by the SOFC.

As with the first and second embodiments, the power plant 230 of FIG. 3 can separately generate hydrogen. In addition, the power plant 230 can utilize and process natural gas having no, little, or high carbon dioxide content.

It will be appreciated by those skilled in the art, that the third embodiment may be limited to processing methane containing 0-5% carbon dioxide in the gas stream unless the carbon dioxide in the stream is separated prior to liquefaction of the methane in the heat exchanger 211. More particularly, carbon dioxide will freeze as the combined gas stream is cooled to liquefaction temperatures. If the natural gas stream includes more than 5% carbon dioxide, in order to avoid freezing problems, it is desirable to separate the carbon dioxide from the methane utilizing any known technique and apparatus such as a hollow fiber membrane or other membranes, PSA (pressure swing adsorption), TSA (thermal swing adsorption), or TPSA (thermal-pressure swing adsorption) adsorption apparatus, or amine absorption apparatus (none of which are shown). With membrane technology, a predetermined molecular pore size is used to separate the carbon dioxide from the methane. In PSA, TSA, or TPSA adsorption apparatus, a high pressure stream is passed through one bed where the carbon dioxide is adsorbed. After this bed has been online for a predetermined length of time and is saturated with carbon dioxide, the feed is switched to a second bed. While the feed is switched to the second bed, the first bed is regenerated using the low pressure effluent stream from the liquefier, or using hot air, in the PSA, TSA, or TPSA cycle. In amine absorption, a liquid amine is used to absorb carbon dioxide from the natural gas stream. The carbon dioxide laden amine is thereafter distilled to release the carbon dioxide. Regardless of which separation mechanism is utilized, it is preferred that the resulting natural gas stream have 0-5% carbon dioxide contained therein. With an original or processed natural gas stream having 0-5% carbon dioxide, a molecular sieve (not shown) may be used to further separate the carbon dioxide from the methane before application to the heat exchanger, and/or a reversing exchanger mode may be used such that the "natural gas in" stream and the outlet stream which are provided to the heat exchanger 234 exchange passages in exchangers 211a, 211b, 211c and 211d so that carbon dioxide from the feed stream is frozen out in one passage and then evaporated by the low-pressure stream. In this manner, a blocking freeze-up of the carbon dioxide is avoided.

Figure 4:
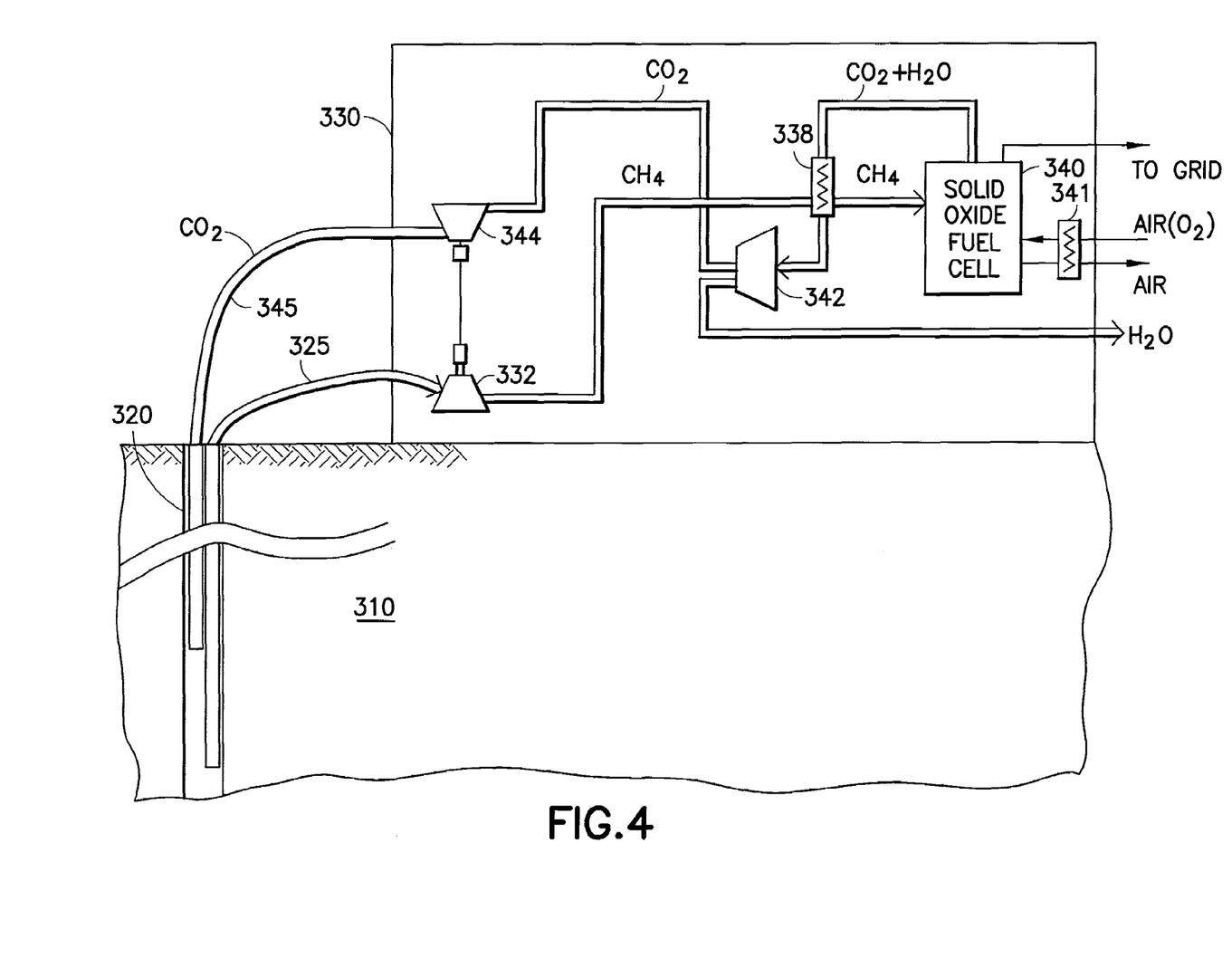
FIG. 4 is a schematic diagram of a fourth embodiment of the invention.

A fourth embodiment of the invention is seen in FIG. 4. The fourth embodiment is similar to the first embodiment and like parts are shown with like numbers increased by "300". Thus, a formation 310 having natural gas (methane) is shown with a borehole or well 320 which is used for producing the natural gas. The natural gas is generally produced according to well-known techniques at a pressure range of between a few hundred psig to over ten thousand psig primarily depending upon the depth in the formation from which the gas is produced. The temperature of the gas is also typically elevated relative to the ambient formation surface temperature. According to the fourth embodiment, the natural gas produced at the wells 320 is piped via piping or tubing 325 to a power plant 330 which is located at or nearby the formation 310. The power plant 330 includes the following elements: one or more turbo-expanders 332, an optional heat exchanger 338, a solid oxide fuel cell (SOFC) 340, a separator 342, and a compressor 344.

The power plant 330 receives the natural gas and runs it through one or more turbo-expanders 332 (one shown) where the expansion of the natural gas reduces its temperature and pressure, and where work is recovered as useful power (as described hereinafter). The outlet of the turbo-expander is optionally run through a heat exchanger 338 and then provided to the SOFC 340.

The SOFC 340 is a solid oxide fuel cell which functions substantially as SOFCs sold by Siemens, AG of Germany or Acumentrics of Westwood Massachusetts. In particular, the methane gas stream is provided to the SOFC with an air stream containing oxygen. The reaction that takes place in the SOFC 340 is $CH_4 + 2O_2 \leftrightarrow 2H_2O + CO_2$. This reaction is exothermic and will liberate a significant amount of energy. Because some methane may not react, an after-burner (not shown) can be utilized.

SOFCs operate at a high temperature. The output of the SOFC 340 is not only electric power and heat, but water (steam), carbon dioxide, and air with less oxygen. The air is released to the ambient atmosphere, and may be run through an optional heat exchanger 341 to warm incoming air. The water and carbon dioxide are separated by separator 342 which may be implemented as a membrane or a cyclone separator. The steam is preferably used to preheat the incoming methane gas stream via heat exchanger 338. After cooling, high purity water is obtained from the steam, and the water may be bottled, stored or otherwise used (e.g., for agriculture). The carbon dioxide separated by the separator 342 is sent to one or more compressors 344 (one shown) which increases the pressure of the $CO_2$ to a level that permits pumping of the carbon dioxide via pipes or tubing 345 down into a well 320 and into the formation 310 for sequestration therein. While a dual completion well 320 is shown in FIG. 4, with methane gas being produced from the same well as which the carbon dioxide is pumped down for sequestration, as will be appreciated by those skilled in the art, the well into which the carbon dioxide is pumped for sequestration may or may not be the same well from which the methane is produced.

According to one aspect of the invention, and as described above with reference to the other embodiments, the compressor(s) 344 of the system are preferably powered by and share a shaft with the turbo-expanders 332 of the system. Thus, all of the work recovered by the turbo-expander 332 is used on the compression side to drive the compressor 344. The direct transfer of work by the turbo-expander due to the expansion of the high pressure methane coming from the formation to the compressor for the purpose of compressing the carbon dioxide for sequestration, adds significantly to the efficiency of the system. If additional compression of the carbon dioxide is required, some of the electricity generated by the SOFC can be used to run an additional compressor.

It should be appreciated by those skilled in the art that the power plant 330 of FIG. 4 is capable of processing a natural gas stream having no, low or high carbon dioxide content. In particular, the carbon dioxide will move with the methane stream through any expanders and heat exchangers and will be provided to the SOFC with the methane stream. The carbon dioxide in the methane will be separated by separator 342 along with the carbon dioxide generated by the reaction in the SOFC.

It will be appreciated by those skilled in the art that the particular techniques utilized for carbon dioxide sequestration downhole are outside the scope of this invention. At the same time, in designing any power plant which operates according to the invention, it is desirable to determine the pressure at which the carbon dioxide is going to be injected back into the formation so that account may be taken of the number of compressors required or desired and the compression ratios at which they operate. Generally, if possible, it will be desirable to inject the carbon dioxide into the formation at a pressure below the pressure at which the methane is produced. Thus, it will be generally desirable to inject the carbon dioxide into a layer of the formation which is closer to the surface than the layer(s) from which the methane is being produced. However, it will also be recognized that it is possible to inject the carbon dioxide at a higher pressure than the methane production pressure.

Those skilled in the art will also appreciate that according to one aspect of the invention it is highly desirable to locate the power plant at the well sites (on the gas producing formation) so that piping of the methane to the power plant and the carbon dioxide waste product from the power plant is minimized. Thus, for purposes of this invention, a power plant is to be considered to be "at or near" the well site if it is within 100 km of the well site. Where the power plant is located directly at the well site, it will generally be desirable to extend the electric grid so that the power plant can be hooked up to the grid. However, it is possible to use the electric power generated by the fuel cells of the invention for any desired industrial purpose and/or to store the electricity in batteries or other electrical storage systems.

It further should be recognized by those skilled in the art that various aspects of the invention may be carried out independently of other aspects of the invention. Thus, for example, the SOFC can be replaced with other types of fuel cells or other power generation cycles while still coupling the shafts of the turbo-expander (which generates work from the methane) and the compressor (which compresses the carbon dioxide) together.

There have been described and illustrated herein several embodiments of a natural gas power plant with carbon dioxide sequestration and related methods. While particular embodiments of the invention have been described, it is not intended that the invention be limited thereto, as it is intended that the invention be as broad in scope as the art will allow and that the specification be read likewise. Thus, while particular reformer, shifter and SOFC apparatus have been disclosed, it will be appreciated that other apparatus could be utilized as well. In addition, single systems have been described, it will be appreciated that a power plant may have multiple systems which operate in parallel, or a single scaled system depending upon the amount of natural gas it will be processing. Moreover, while particular configurations have been disclosed in reference to heat exchangers, turbo-generators, compressors, and moisture separators, it will be appreciated that other configurations could be used as well, as single units may be replaced by multiple units and vice versa. Further, while a power plant located on the natural gas producing formation has been described, it will be appreciated that the power plant can be located "near" the formation, with the natural gas being piped to the plant, and the carbon dioxide being piped to a desired location for sequestration downhole. It will therefore be appreciated by those skilled in the art that yet other modifications could be made to the provided invention without deviating from its spirit and scope as claimed.

What is claimed is:

1. A natural gas power plant located at or near a methane-producing formation traversed by at least one borehole, the natural gas power plant comprising:
   a first piping coupled to said borehole, said first piping transporting said methane;
   a turbo-expander coupled to said first piping, wherein said turbo-expander receives said methane produced from the borehole at a first pressure and generates work therefrom, said methane exiting said turbo-expander at a reduced pressure relative to said first pressure, said turbo-expander having a shaft;
   a fuel cell and separator coupled to said turbo-expander, wherein outputs from said fuel cell and separator include electricity, heat, water, and carbon dioxide;
   a compressor which receives said carbon dioxide and compresses it, wherein said compressor is mechanically coupled to said shaft of said turbo-expander; and
   a second piping coupled to said compressor and transporting compressed carbon dioxide into a geological formation for sequestration therein.

2. A natural gas power plant according to claim 1, wherein:
   said compressor utilizes said shaft of said turbo-expander as a shaft of said compressor.

3. A natural gas power plant according to claim 1, further comprising:
   a reformer which couples said turbo-expander and said fuel cell and separator, said reformer receiving water and said methane from said turbo-expander and generating as outputs therefrom hydrogen gas and carbon monoxide.

4. A natural gas power plant according to claim 3, wherein:
   at least a portion of said water output from said fuel cell is used as said water provided to said reformer.

5. A natural gas power plant according to claim 3, wherein:
   said carbon monoxide and said hydrogen outputs from said reformer are provided to said fuel cell with oxygen, and said fuel cell generates said electricity, heat, and a carbon dioxide and water stream therefrom.

6. A natural gas power plant according to claim 5, wherein:
   said separator separates said carbon dioxide from said water in said stream.

7. A natural gas power plant according to claim 6, wherein:
   said fuel cell is a solid oxide fuel cell, and said oxygen is obtained from an air intake.

8. A natural gas power plant according to claim 3, further comprising:
   a shifter which receives said carbon monoxide and said hydrogen gas outputs from said reformer and utilizes said outputs together with water to generate a carbon dioxide and hydrogen gas stream, wherein said steam is provided to said separator which provides said hydrogen to said fuel cell which generates said electricity, said heat, and said water.

9. A natural gas power plant according to claim 8, wherein:
   said fuel cell is a solid oxide fuel cell with an air intake.

10. A natural gas power plant according to claim 3, further comprising:
    a heat exchanger which uses said heat from said fuel cell to heat at least one of said water and said methane utilized by said reformer.

11. A natural gas power plant according to claim 10, wherein:
    said heat exchanger heats both said water and said methane utilized by said reformer.

12. A natural gas power plant according to claim 1, wherein:
    said geological formation in which said carbon dioxide is sequestered is said methane producing formation.

13. A natural gas power plant according to claim 12, wherein:
    said borehole is a dual completion well from which said methane is obtained at a first depth and to which said carbon dioxide is sequestered at a second depth different from said first depth.

14. A natural gas power plant located at a methane-producing formation traversed by at least one borehole, the natural gas power plant comprising:
    a first piping coupled to said borehole, said first piping transporting said methane;
    a reformer which receives water and said methane and generates as outputs therefrom hydrogen gas and carbon monoxide;
    a solid oxide fuel cell and separator coupled to said reformer output, wherein outputs from said fuel cell and separator include electricity, heat, water, and carbon dioxide;
    a compressor which receives said carbon dioxide and compresses it; and
    a second piping coupled to said compressor and transporting compressed carbon dioxide into said formation for sequestration therein.

15. A natural gas power plant according to claim 14, further comprising:
    a turbo-expander coupled to said first piping, wherein said turbo-expander receives said methane produced from the borehole at a first pressure and generates work therefrom, said methane exiting said turbo-expander at a reduced pressure relative to said first pressure, said turbo-expander having a shaft, wherein said compressor is mechanically coupled to said shaft.

16. A natural gas power plant according to claim 14, wherein:
    said carbon monoxide and said hydrogen outputs from said reformer are provided to said solid oxide fuel cell with air, and said fuel cell generates said electricity, heat, and a carbon dioxide and water stream therefrom, and said separator separates said carbon dioxide from said water in said stream.

17. A natural gas power plant according to claim 14, further comprising:
    a shifter which receives said carbon monoxide and said hydrogen gas outputs from said reformer and utilizes said outputs together with water to generate a carbon dioxide and hydrogen gas stream, wherein said steam is provided to said separator which provides said hydrogen to said fuel cell which generates said electricity, said heat, and said water.

* * * * *